(12) United States Patent
Dutta et al.

(10) Patent No.: US 11,522,642 B2
(45) Date of Patent: Dec. 6, 2022

(54) INTELLIGENT PACKET REPETITION IN MOBILE SATELLITE SERVICE (MSS) LINKS TO OVERCOME CHANNEL BLOCKAGES

(71) Applicant: ATC Technologies LLC, Reston, VA (US)

(72) Inventors: Santanu Dutta, Vienna, VA (US); Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 77 days.

(21) Appl. No.: 17/211,115

(22) Filed: Mar. 24, 2021

(65) Prior Publication Data

US 2021/0306115 A1    Sep. 30, 2021

Related U.S. Application Data

(60) Provisional application No. 62/994,560, filed on Mar. 25, 2020.

(51) Int. Cl.
*H04L 1/08* (2006.01)
*H04L 1/20* (2006.01)
(Continued)

(52) U.S. Cl.
CPC .............. *H04L 1/08* (2013.01); *H04L 1/1607* (2013.01); *H04L 1/189* (2013.01); *H04L 1/203* (2013.01); *H04W 28/04* (2013.01); *H04L 1/1812* (2013.01)

(58) Field of Classification Search
CPC ......... H04L 1/08; H04L 1/1607; H04L 1/189; H04L 1/203; H04L 1/1812; H04W 28/04
See application file for complete search history.

(56) References Cited

U.S. PATENT DOCUMENTS

| 8,610,573 B2 * | 12/2013 | Kazanchian | ......... H05K 1/0218 |
| | | | 370/338 |
| 11,395,225 B1 * | 7/2022 | Wong | ................ H04W 72/0413 |

(Continued)

OTHER PUBLICATIONS

Yang, Q., Lim, A., Li, S. et al. ACAR: Adaptive Connectivity Aware Routing for Vehicular Ad Hoc Networks in City Scenarios. Mobile Netw Appl 15, 36-60 (2010). (Year: 2010).*

(Continued)

*Primary Examiner* — Cynthia Britt
(74) *Attorney, Agent, or Firm* — Michael Best & Friedrich LLP

(57) ABSTRACT

Systems and methods for intelligent packet repetition in mobile satellite service links to overcome channel blockages. One example method includes transmitting and receiving packetized wireless communications between first and second communications devices via a bidirectional wireless link. The method includes receiving, by a first communications device from a second communications device, feedback information including an indication of a blockage in the communication channel, the indication including information indicating the presence and extent of the blockage, wherein the feedback does not include status indications for individual received packets. The method includes, responsive to receiving the indication of a blockage in the communication channel, determining a packet repeat value based on the feedback information, wherein the packet repeat value is greater than one. The method includes modifying a transmit signal of the bidirectional wireless link to repeat transmitted packets based on the packet repeat value and transmitting the downlink signal. The decision to turn on packet repetition, the number of repeats, may also be informed by the geographic location of the receiver.

22 Claims, 7 Drawing Sheets

Received signal amplitude at S-Band under narrow-band conditions

(51) Int. Cl.
*H04W 28/04* (2009.01)
*H04L 1/18* (2006.01)
*H04L 1/16* (2006.01)

(56) References Cited

U.S. PATENT DOCUMENTS

| | | |
|---|---|---|
| 2004/0252655 A1 | 12/2004 | Lim et al. |
| 2011/0179329 A1 | 7/2011 | Kim et al. |
| 2013/0310102 A1 | 11/2013 | Chao et al. |
| 2014/0200003 A1 | 7/2014 | Kodali et al. |
| 2014/0362755 A1 | 12/2014 | Yu et al. |
| 2015/0215077 A1 | 7/2015 | Ratasuk et al. |
| 2017/0085354 A1* | 3/2017 | Kudekar .............. H04L 1/1812 |
| 2017/0367083 A1 | 12/2017 | Cave et al. |

OTHER PUBLICATIONS

PCT/US2021/023872 International Search Report and Written Opinion dated Jun. 23, 2021 (27 pages).

* cited by examiner

INTELLIGENT PACKET REPETITION IN MOBILE SATELLITE SERVICE (MSS) LINKS TO OVERCOME CHANNEL BLOCKAGES

RELATED APPLICATION

The present application is related to and claims benefit under 35 U.S.C. § 119(e) from U.S. Provisional Patent Application Ser. No. 62/994,560, filed Mar. 25, 2020, titled "INTELLIGENT PACKET REPETITION IN MOBILE SATELLITE SERVICE (MSS) LINKS TO OVERCOME CHANNEL BLOCKAGES," the entire contents of which being incorporated herein by reference.

FIELD

Embodiments described herein relate to satellite wireless communications systems and, more particularly, to providing intelligent packet repetition in mobile satellite service (MSS) links to overcome channel blockages.

SUMMARY

Satellite communications systems and methods are widely used for communications with user equipment (UE). Satellite communications systems and methods generally employ at least one space-based component, such as one or more satellites, which are configured to wirelessly communicate with UEs on the Earth.

The overall design and operation of cellular satellite systems are well known to those having skill in the art and need not be described further herein. Moreover, as used herein, the term "UE" includes cellular or satellite radiotelephones with or without a multi-line display; Personal Communications System (PCS) terminals (e.g., user terminals) that may combine a radiotelephone with data processing, data communications capabilities; smart telephones that can include a radio frequency transceiver and/or a global positioning system (GPS) receiver; and/or conventional portable computers or other electronic devices, which devices include a radio frequency transceiver. As used herein, the term "transceiver" may refer to a combined transmitter-receiver component or may refer to devices that include separate transmitter and receiver components. A UE also includes any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial locations. Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Mobile satellite service (MSS) operates with relatively low link margins compared to terrestrial wireless systems. This is because of the much greater propagation ranges involved in MSS relative to terrestrial wireless systems. A typical radio frequency propagation scenario for a terrestrial wireless system is illustrated in FIG. 1. In FIG. 1, a UE 102 is in wireless communication with a transmission tower 104 via one or more non-line-of-sight (NLOS) links 106. In terrestrial wireless systems, it is customary to operate with an approximately 20-30 dB margin over a line-of-sight (LOS) link. However, as illustrated in FIG. 1, terrestrial links are normally of non-line-of-sight (NLOS) type. Radio propagation over NLOS links (e.g., the NLOS links 106) occurs mostly by reflections from environmental clutter, for example, buildings 108, trees (not shown), and the like. Terrestrial wireless links are designed so that, despite the direct path being blocked, enough signal power still reaches the receiver of the UE 102 to close the link from a demodulation perspective. Therefore, useful information can be sent over such links. Link closure occurs despite the presence of substantial, excess attenuation and multipath fading relative to a LOS link.

In current systems, useful MSS propagation occurs mostly by LOS links, although some multipath reflection and diffraction may also be present, as illustrated in FIG. 2. FIG. 2 shows a satellite 202 sending a signal to a vehicle mounted mobile satellite terminal 204 in an urban area 206. Although it is desirable to operate MSS in LOS conditions, this is not always possible when the user equipment is mobile, for example, as shown in FIG. 2. As illustrated in FIG. 2, in urban areas, the signal received by the vehicle mounted mobile satellite terminal 204 may switch between LOS modes (e.g., receiving the signal via the LOS path 208) and NLOS modes (e.g., receiving the signal exclusively via the reflected paths 210) randomly as the line of sight path to the satellite 202 is intermittently blocked by buildings 212 and trees 214 as the vehicle moves. The LOS channel also undergoes limited fading due to the environmental multipath, which may be present even when a direct path to the transmitter is also present. This fading is characterized as Rician and has much less depth than the Rayleigh fading present in NLOS channels.

MSS propagation literature (e.g., Fernando Pérez Fontán, et al., "Statistical Modeling of the LMS Channel", IEEE TRANSACTIONS ON VEHICULAR TECHNOLOGY, VOL. 50, NO. 6, NOVEMBER 2001 p. 1549) has identified three major states (i.e., State 1, State 2, and State 3) for the received signal, as illustrated in charts 302 and 304 of FIG. 3. Chart 302 illustrates a received signal amplitude relative to LOS (in dB) as a function of the traveled distance of the signal (in m). Chart 304 illustrates a probability density function for a received signal as a function of the received signal amplitude relative to LOS (in dB). In State 1, the propagation mode is LOS. The signal has a mean value relative to a predetermined mean threshold value 306 that is sufficient to close the link with adequate margin (typically less than 4-5 dB) to accommodate the Rician fading. If the UE is of handheld type, up to 10 dB of link margin may be allowed for body absorption and lower antenna directivity of the UE. In State 2, the direct path to the satellite may be shadowed by tree foliage and subject to knife edge diffraction but no opaque blockage, such as by a building, is present; this is referred to as "shadowing" and results in an incremental pathloss over a clear LOS link of approximately 4 dB. In State 3, the direct path is blocked, leading to typically greater than 15 dB additional pathloss, depending on the nature of the building material.

To counter greater mean path loss and Rayleigh fading, terrestrial wireless links are operated with a link margin of 20-30 dB. This is a luxury that MSS links cannot afford owing to the large propagation distance, the limited aggregate effective isotropic radiated power (EIRP) available on the satellite and the limited user equipment (UE) power. Hence, existing systems, especially for latency sensitive applications like voice, often resign themselves to accepting intermittent blockage (e.g., increased pathloss caused by buildings, trees, and other environmental clutter) as a 'fact of life.' However, for data communications systems that can tolerate some increase in transport latency (e.g., over the 600 ms inherent round-trip delay of a GEO satellite link) time-interleaving has been used to mitigate intermittent channel blockage. For example, Inmarsat-C uses an interleaving depth of 8 s.

Terrestrial wireless systems such as LTE, incorporate a feature known as "Hybrid Automatic Repeat reQuest," or HARQ. HARQ requires a back-and-forth transaction between the transmitter and the receiver for every repeat. In GEO MSS, with an approximately 600 ms round trip delay, implementing HARQ would impose a prohibitive latency and capacity cost. Note that, in terrestrial LTE, the round-trip delay (propagation delay plus HARQ processing time) is only few milliseconds. Therefore, HARQ and other terrestrial system solutions are not able to solve the problems of channel blockages in mobile satellite systems. Sending multiple packet repetitions without an associated ARQ (blind repetition) is also used in LTE, but not as part of a dynamic, adaptive scheme. It is used to statically optimize the link margin for a given UE, especially those in disadvantaged locations. These, blind repetitions, once configured, are static and not adaptive.

To address, among other things, these problems, systems and methods are provided herein for intelligent packet repetition in mobile satellite service (MSS) links to overcome channel blockages. Embodiments described herein provide, among other things, systems and methods for modifying transmit signals to adaptively repeat transmitted packets based on feedback information and combine repeated packets at a receiver. Using such embodiments results in, among other things, an increase in successful demodulation and decoding of the received packets.

One example embodiment discloses a wireless communications system. The system includes a first communications device including a transceiver and an electronic processor. The electronic processor is configured to transmit and receive packetized wireless communications with a second communications device via a bidirectional wireless link. The electronic processor is configured to receive, from the second communications device, feedback information including an indication of a blockage in the communication channel, the indication including information indicating the presence and extent of the blockage, wherein the feedback does not include status indications for individual received packets. The electronic processor is configured to, responsive to receiving the indication of a blockage in the communication channel, determine a packet repeat value based on the feedback information, wherein the packet repeat value is greater than one. The electronic processor is configured to modify a downlink signal of the bidirectional wireless link to repeat transmitted packets based on the packet repeat value. The electronic processor is configured to control the transceiver to transmit the downlink signal.

Another example embodiment discloses a method for intelligent packet repetition. The method includes transmitting and receiving packetized wireless communications between a first communications device and a second communications device via a bidirectional wireless link. The method includes receiving, by the first communications device from the second communications device, feedback information including an indication of a blockage in the communication channel, the indication including information indicating the presence and extent of the blockage, wherein the feedback does not include status indications for individual received packets. The method includes, responsive to receiving the indication of a blockage in the communication channel, determining a packet repeat value based on the feedback information, wherein the packet repeat value is greater than one. The method includes modifying a downlink signal of the bidirectional wireless link to repeat transmitted packets based on the packet repeat value. The method includes transmitting the downlink signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
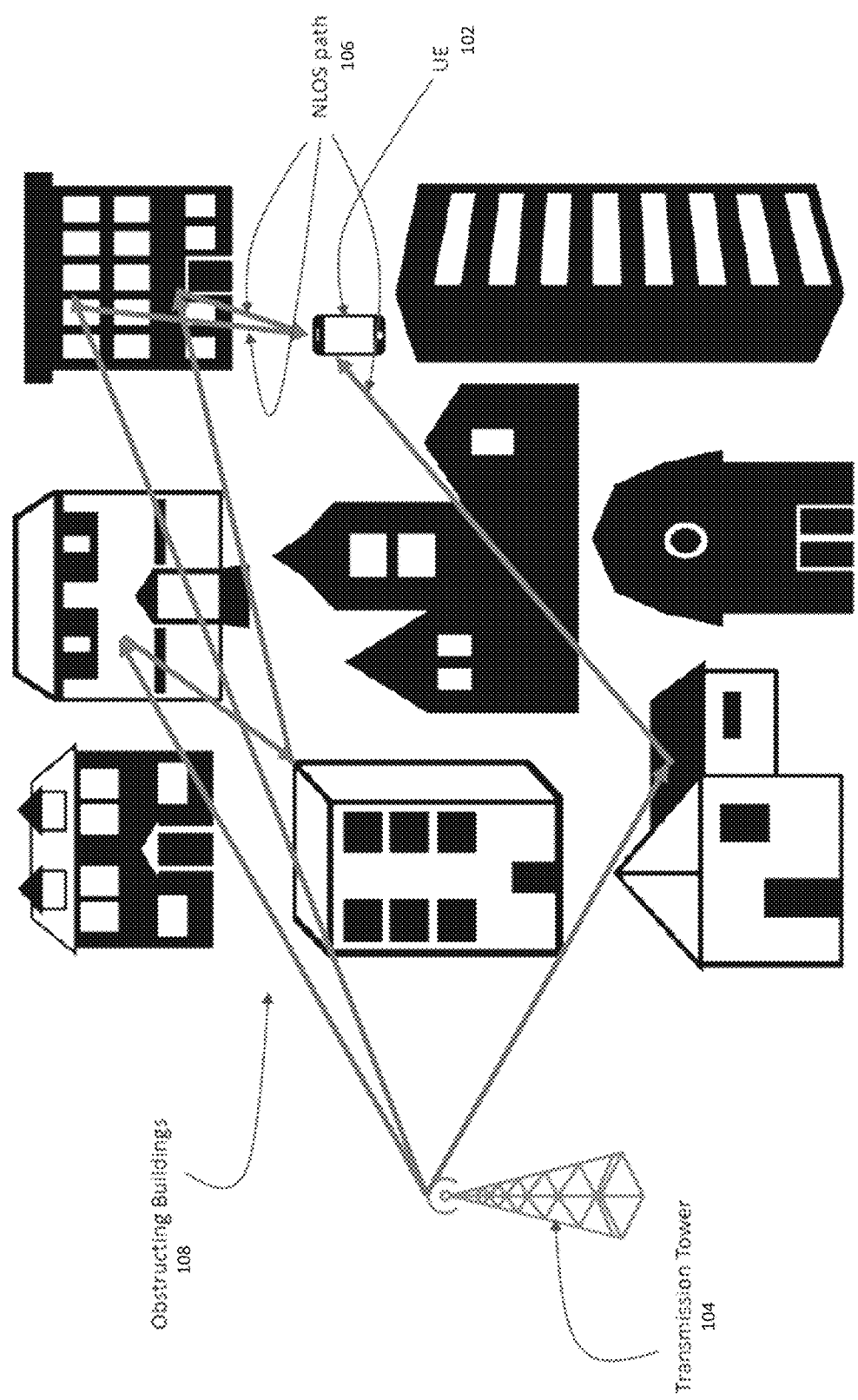
FIG. 1 is a diagram of an RF signal propagation scenario for a terrestrial wireless network.
Figure 2:
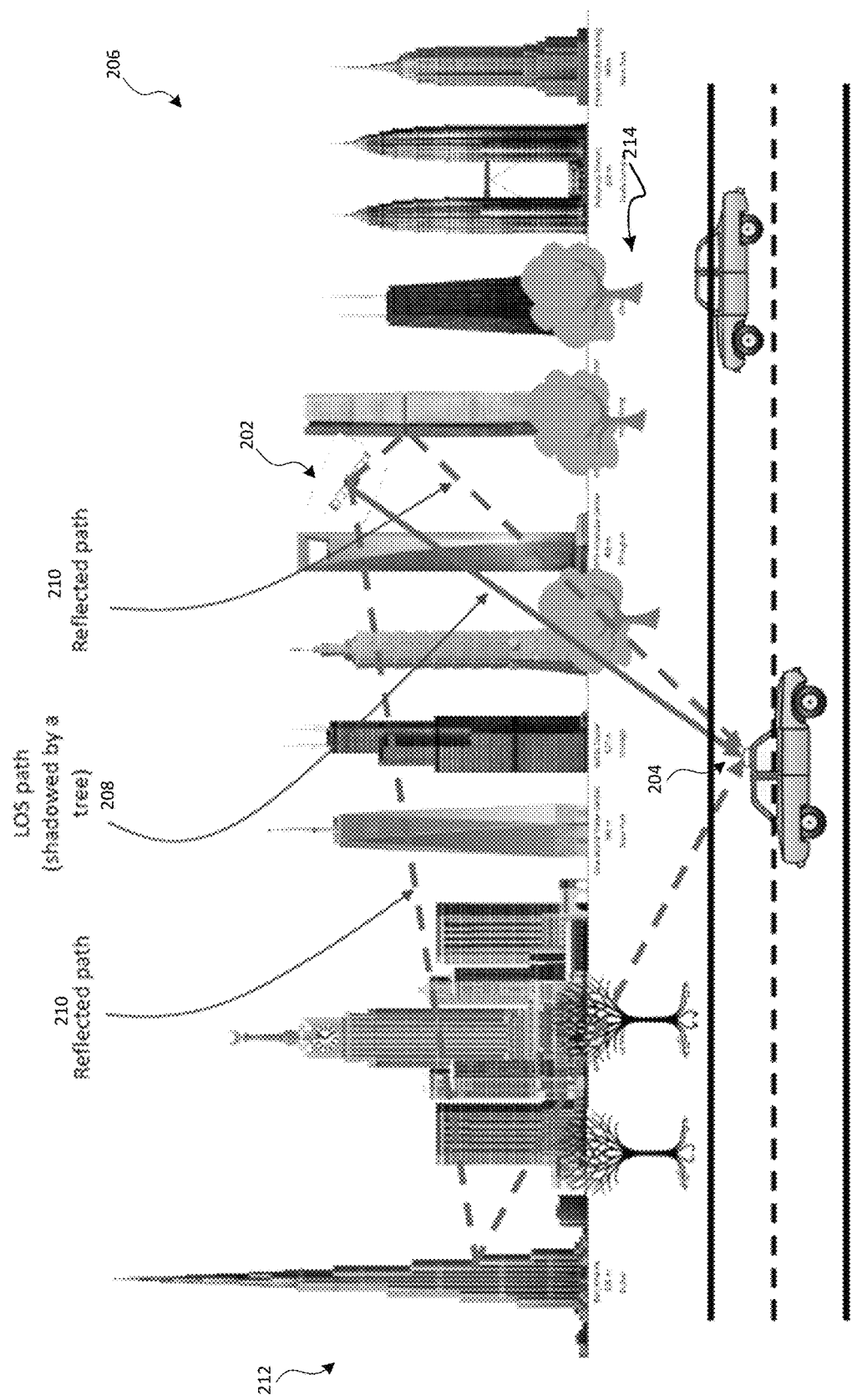
FIG. 2 is a diagram of an RF signal propagation scenario for an MSS wireless network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any exemplary embodiments of the invention are explained in detail, it is to be understood that the invention is not limited in its application to the details of construction and the arrangement of components set forth in the following description or illustrated in the following drawings. The invention is capable of other embodiments and of being practiced or carried out in various ways.

It should also be noted that a plurality of hardware and software-based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics based aspects of the invention may be implemented in software (e.g., stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the example systems or devices presented herein is illustrated with a single exemplar of each of its component parts. Some examples may not describe or illustrate all components of the systems. Other example embodiments may include more or fewer of each of the illustrated components, may combine some components, or may include additional or alternative components.

As noted, methods used to mitigate channel blockage in terrestrial wireless systems may be ineffective for use with MSS wireless networks. Accordingly, embodiments provided herein provide systems that, responsive to the detection of channel blockage use adaptive packet repetition at the transmitter and combining of the repeated packets at the receiver to increase the probability of successful demodulation/decoding of the packet. As set forth herein, packets are repeated only when required and the number of repetitions is dependent on the pathloss created by the blockage.

Figure 4:
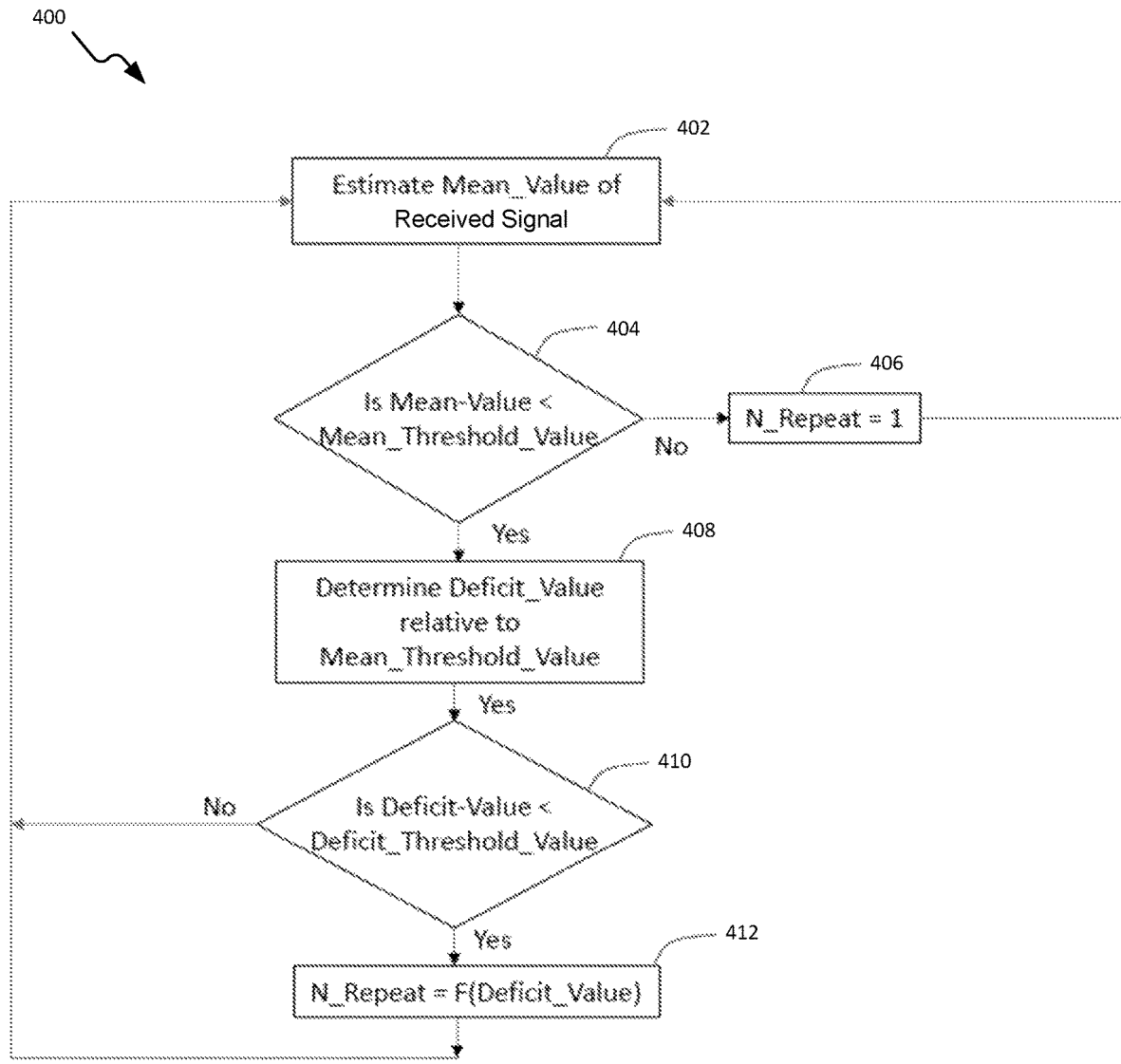
FIG. 4 is a flow chart illustrating a method of packetized wireless communications between two nodes according to some embodiments.
Figure 5:
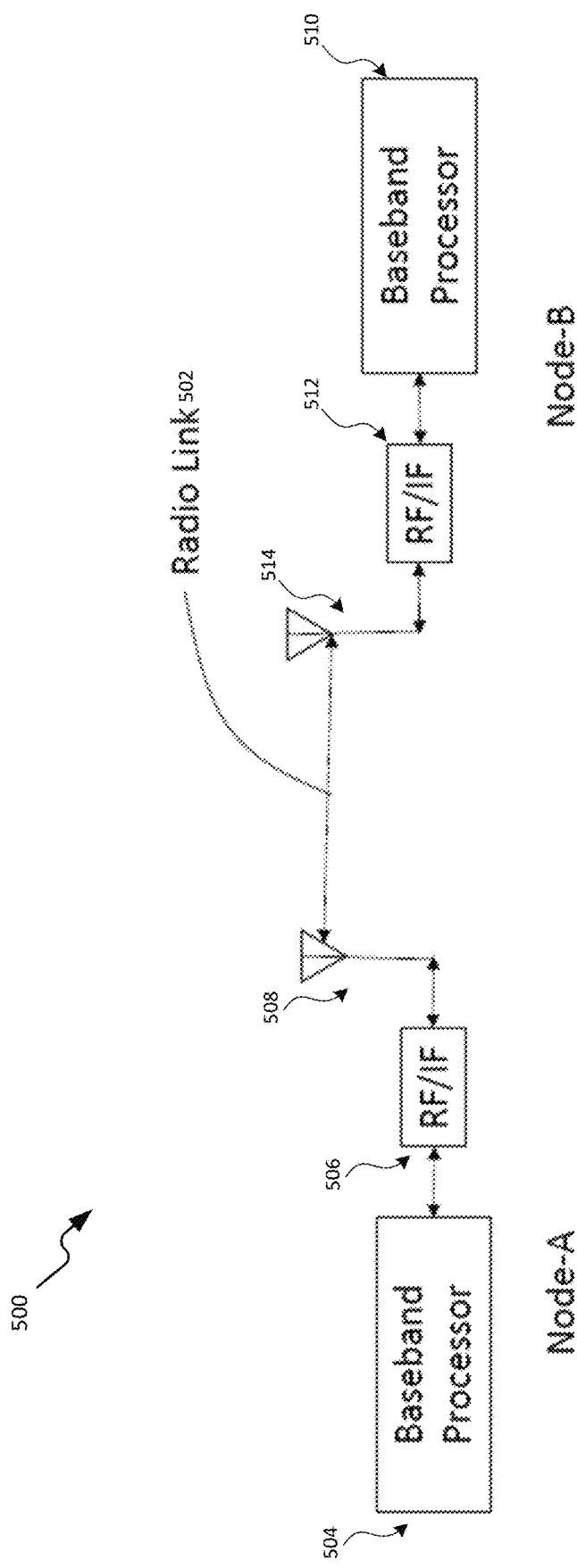
FIG. 5 is a diagram of a wireless communications system according to some embodiments.

FIG. 4 is a flowchart illustrating a method 400 for intelligent packet repetition. In some embodiments, the method 400 may be performed with respect to a bidirectional wireless link between two nodes (e.g., as illustrated in FIG. 5). FIG. 5 schematically illustrates a wireless communications system 500. The wireless communications system 500 includes two nodes, Node A and Node B. Node A and Node B are communications device, which communicate via a bidirectional wireless link 502. In some embodiments, Node A and Node B are part of a larger wireless network (e.g., an MSS network). In one example MSS-related embodiment, Node A is a satellite or a hub (also referred to as a gateway) of a satellite network and Node B is a UE of the satellite network.

Node A includes a baseband processor 504, a transceiver 506, and an antenna 508. The baseband processor 504 includes digital signal processors (DSPs) and other hardware or software suitable to perform the methods described herein. In some embodiments, the baseband processor 504 controls the transceiver 506 to transmit and receive voice, video, and other data to and from Node B. The baseband processor 504 encodes and decodes digital data sent and received by the transceiver 506. The transceiver 506 transmits and receives radio signals to and from, for example, Node B using the antenna 508. The baseband processor 504 and the transceiver 506 may include various digital and analog components (e.g., memory and input-output (I/O) ports), which for brevity are not described herein and which may be implemented in hardware, software, or a combination of both. Similarly, Node A includes other hardware and software components not described herein. Some embodiments include separate transmitting and receiving components, for example, a transmitter and a receiver, instead of a combined transceiver 506. Node B includes a baseband processor 510, a transceiver 512, and an antenna 514. The components of Node B are similar to their corresponding components in Node A and are configured to operate in a similar fashion according to embodiments described herein.

Embodiments described herein, including the method 400, may be implemented by the baseband processors 504, 510 or by general microprocessors, also referred to as central processing units (CPUs) (not shown), coupled to the baseband processors 504, 510 and other components of Node A and Node B. The system 500 described is but one example. Other implementations (including hardware, software, or combinations thereof) are possible. The inventive concepts set forth herein apply to other implementation approaches.

Relative to the MSS-related embodiment, the methods described herein may be applied to both the forward link (FL) (also referred to as the downlink (DL)) and to the return link (RL) (also referred to as the uplink (UL)). As used herein, the term "link" refers to the service link (e.g., the satellite-to-UE link). In more general terms, for both the forward and return links of the service link, the term "transmitter" may refer to satellite for FL or UE for RL, and the term "receiver" may refer to UE for FL or satellite for RL.

Returning to FIG. 4, one embodiment of the method 400 is now described. By way of example, the method 400 is described in terms of an MSS use case, where Node A is a satellite and Node B is a UE. In particular, the method 400 is described as being performed by the baseband processor 510 of Node B. However, it should be understood that in some embodiments, portions of the method 400 may be performed by other devices, including for example, Node A. For ease of description, the method 400 is described in terms of an MSS including only two nodes. However, the method 400 may be applied to an MSS including multiple satellites and tens, hundreds, or even thousands of UEs. In addition, as noted, the method 400 is applicable to other use cases.

At block 402, the baseband processor 510 estimates the mean value of the received signal (referred to herein as the Mean_Value). Note that, in the MSS case, "link" refers to the service link (i.e., the satellite-to-UE link). In some embodiments, the baseband processor 510 determines the Mean_Value by receiving and processing a sounding signal (also referred to as pilot signal), at the transceiver 512.

A Mean_Value may be determined in both the forward and return links by receiving and processing a sounding signal. For example, in the forward link, the sounding signal is generated and transmitted by a satellite base station subsystem (S-BSS), relayed by the satellite (e.g., Node A of FIG. 5), and received and processed by the UE (e.g., Node B of FIG. 5). In another example, for the return link, the sounding signal is generated and transmitted by the UE (e.g., Node B of FIG. 5), relayed by the satellite (e.g., Node A of FIG. 5) and received/processed by the S-BSS. As used herein, relaying a signal means receiving the signal, amplifying and frequency shifting the signal, and transmitting the signal at the shifted frequency. In some embodiments, it is desirable that the sounding signal be of spread spectrum type, such as a pseudo-noise (PN) signal, so that the signal can be received, and the pathloss measured reliably, even when the power spectral density (PSD) of the received PN signal, S, is well below that of the ambient noise and interference (N+I). The spread spectrum gain of the PN signal enables reliable signal reception with negative S/(N+I) PSD ratios. This provides a large dynamic range for pathloss measurement. The processing of the spread spectrum signal (i.e., the operations of signal acquisition and dispreading) may be performed according to known techniques.

At block 404, the baseband processor 512 determines whether the Mean_Value (determined at block 402) is less than a first threshold value (referred to herein as the Mean_Threshold_Value). For example, the baseband processor 510 compares numerical values for the Mean_Value and the Mean_Threshold_Value. In some embodiments, the Mean_Threshold_Value is set to a fixed, empirically determined value. In other embodiments, the Mean_Threshold_Value may be determined automatically by, for example, using machine learning methods. For example, Node B or another component of the wireless communications system 500 (e.g., a computer server) may use various machine learning methods to analyze historical Mean_Value data points stored in a memory and/or a database to make determinations regarding the Mean_Threshold_Value.

Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as, among other things, an intelligent system, an artificial intelligence (AI) system, a cognitive system, or an intelligent agent.

Figure 3:
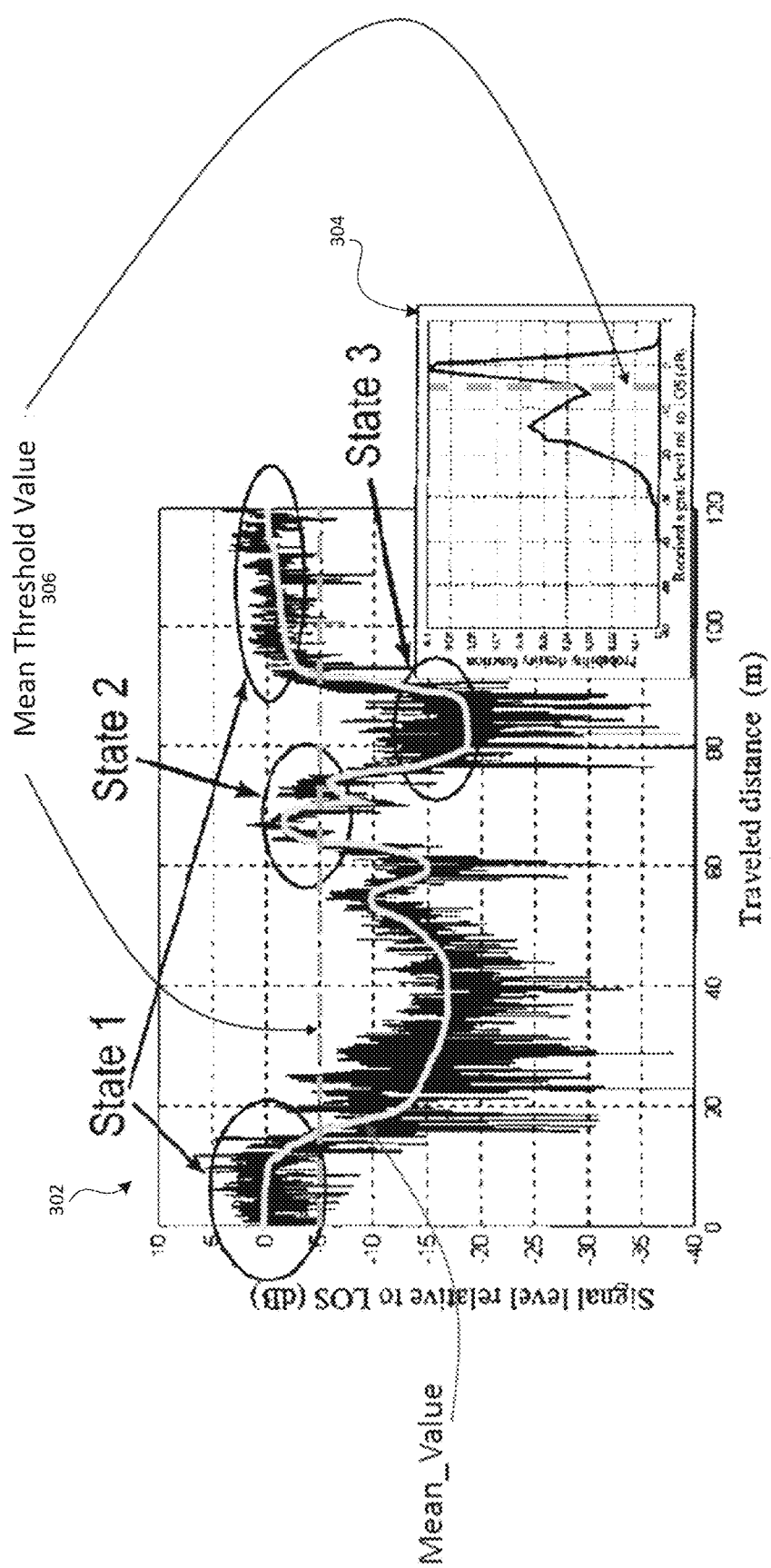
FIG. 3 is a diagram of some example received signal states for an MSS wireless network.

In some embodiments, an intelligent agent analyzes the accumulated history of the Mean_Value over some observation time (T_obs) for which a typical value might be 15 minutes, and which is informed by the loading of the spotbeam in which the UE is located over a similar observation period. In some embodiments, the intelligent agent computes a probability distribution function (PDF) of Mean_Value over T_obs, to produce a chart, such as the chart 304 shown in the inset in FIG. 3. This PDF may be used to determine the Mean_Threshold_Value. In some embodiments, the Mean_Threshold_Value may be chosen by using criteria such as: at any time, the increased load on the network due to packet repetition must not cause the network load to reach more than 70% of the available capacity. Machine Learning may be used to inform the selection of Mean_Threshold_Value.

When Mean_Value is not less than the Mean_Threshold_Value (at block 404), the baseband processor 510 (at block 406) determines that no packet repetitions are necessary and sets the value of a packet repeat value (N_Repeat) to 1 (representing a single transmission, without repetition). The value of N_Repeat is used by the baseband processor 510 to control how many times a packet is re-transmitted. The value of N_Repeat is communicated by Node B 510 (the receiver in this example) to Node A 504 (the transmitter in this example).

When Mean_Value is less than the Mean_Threshold_Value (at block 404), the baseband processor 510 (at block 408) determines a Deficit_Value for the link. The Deficit_Value is the difference between Mean_Value and Mean_Threshold_Value:

$$\text{Deficit\_Value} = \text{Mean\_Threshold\_Value} - \text{Mean\_Value}. \quad (1)$$

Note that Deficit_Value is always a positive number.

At block 410, the baseband processor 504 determines whether the Deficit_Value (determined at block 408) is less than a second threshold value (referred to herein as the Deficit_Threshold_Value). For example, the baseband processor 504 compares numerical values for the Deficit_Value and the Deficit_Threshold_Value. It is possible for the link margin deficit (represented by Deficit_Value) to exceed the value beyond which mitigation is deemed either technically infeasible or undesirable based on the capacity expenditure required. An example Deficit_Threshold_Value may be 30 dB. In some embodiments, the Deficit_Threshold_Value is set to a fixed, empirically determined value. In other embodiments, the Deficit_Threshold_Value is set automatically, for example by using machine learning methods to analyze historical data (including link margin deficit values, related N_Repeat values, and data indicating packet demodulation and decoding success or error rates).

When Deficit_Value is not less than the Deficit_Threshold_Value (at block 410), the baseband processor 510 returns to block 402 and begins determining and processing another Mean_Value for the link's pathloss.

When Deficit_Value is less than the Deficit_Threshold_Value (at block 410), the baseband processor 504 (at block 412) determines an N_Repeat value, which indicates a specific number of repetitions to be applied to packet transmissions. In some embodiments, N_Repeat is determined as a function F of the Deficit_Value: N_Repeat=F (Deficit_Value).

As noted, the Deficit_Threshold_Value is an upper limit beyond which packet repetitions are unlikely to yield practical benefits or the capacity tax may be too high. In some embodiments, F(Deficit_Value) is determined based on the effectiveness of packet repetition and recombination. Methods of combining of repeated packets are known in the prior art. The available options include fully coherent combining and partially coherent/partially incoherent combining. The method chosen has implications for the receiver processor, with fully coherent combining being more challenging to implement but yielding more link margin.

As noted, in some embodiments, the tasks required to sense the presence and depth of blockage, and determine N_Repeat as described in FIG. 4, may be differently apportioned between the receiver (Node B) and the transmitter (Node A) than described above. Specifically, the role of the receiver (Node B) may be limited to sensing a channel quality indicator parameter (CQI), which is indicative of the received SNIR—hence the depth of blockage—and communicating the CQI to the transmitter (Node A). Node A may construct a profile of the received SNIR based on the reported CQI and determine all parameters necessary to execute the flow diagram of FIG. 4, including Mean_Value of pathloss and Mean_Threshold_Value. This approach may be preferred in embodiments seeking to maintain affinity to existing standards, as CQI measurement by a receiver and feedback to the transmitter is supported in cellular standards, such as LTE and 5GNR.

Figure 6:
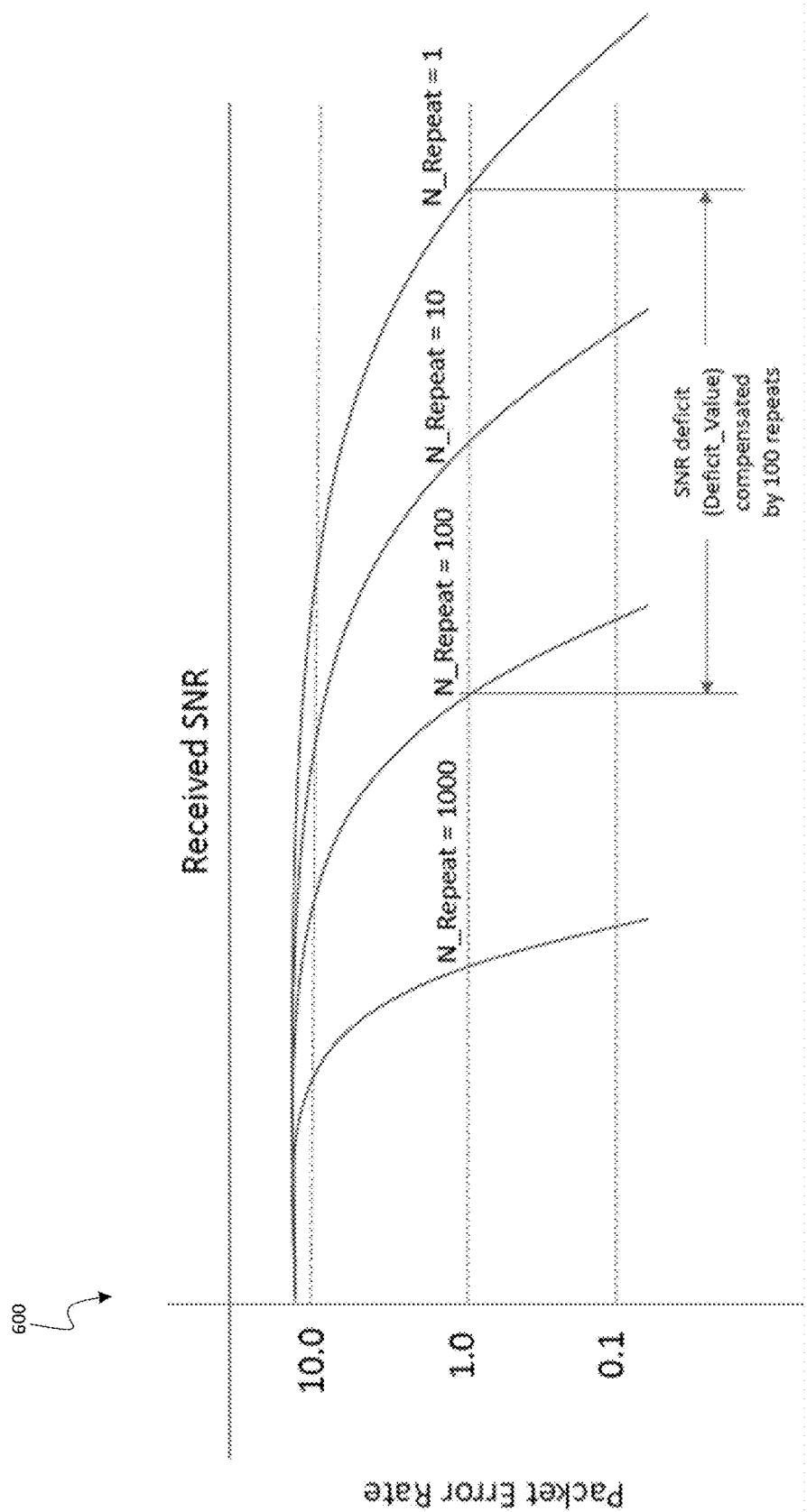
FIG. 6 is a chart illustrating aspects of the operation of the system of FIG. 5 according to some embodiments.

Regardless of the packet combining method used, a graph of Received Signal-to-Noise Ratio (SNR) versus Packet Error Rate for different numbers of packet repetitions can be constructed to determine the function F. FIG. 6 illustrates an example SNR v. PER graph 600. As illustrated in FIG. 6, the functional relationship between Deficit_Value and N_Repeat can be established. FIG. 6 shows the example for N_Repeat=100. It should be noted that the graph 600 is an example provided solely to explain the concept and does not provide data specific to any particular system. Accordingly, the 'Received SNR' axis has no scale.

The functional roles described above with respect to blocks 401-412 of FIG. 4 may be distributed between the transmitter and the receiver in various combinations. For example, in one embodiment, the receiver performs the Mean_Value estimation, based on signals received on the FL and communicates it back to the transmitter using the RL. The transmitter performs all other functions, including selecting N_Repeat. In another example embodiment, the receiver performs all functions, including selecting the value of N_Repeat. The N_Repeat value is communicated by the receiver to the transmitter.

Regardless of how the functions are distributed between the transmitter and the receiver, from the time of onset of a blockage, a latency of one round trip delay plus processing time (typically less than 10 ms) is unavoidable before the link margin enhancement will take effect. For a GEO satellite link, this will amount to approximately 600 ms. GEO MSS channel characterization campaigns have shown that the blockage duration in urban environments is greater than 5 s for more than 20% of the time (see, e.g., Erich Lutz, et al., "The Land Mobile Satellite Communication Channel-Recording, Statistics, and Channel Model," IEEE TRANSACTIONS ON VEHICULAR TECHNOLOGY, VOL. 40. NO. 2, MAY 1991 p. 315), where 'blockage' is defined as a 5-dB loss in the received SNR. This means that the reaction latency would be limited to 12% of the blockage duration. Therefore, the methods of the present invention have the potential to make a material improvement to link closure probability in such environments without levying an excessive capacity tax.

Implementation of the proposed adaptive packet repetition method may depend on the various embodiments of the system, which would have different impact on the system performance, operation procedures and control signaling between the receiver and the transmitter.

In one example embodiment, the receiver would make the decision as to how many repetitions were needed based on the measurement of the Mean_Value as described herein. The repetition decision is conveyed to the transmitter through return control channel to take the above repetition action. On the transmitter side, where the transmission repetition takes place, the transmitter needs to let the receiver know through forward control channel where in the time frame, that is, exactly when the repetition begins, so that the receiver can demodulate the received stream correctly.

Figure 7:
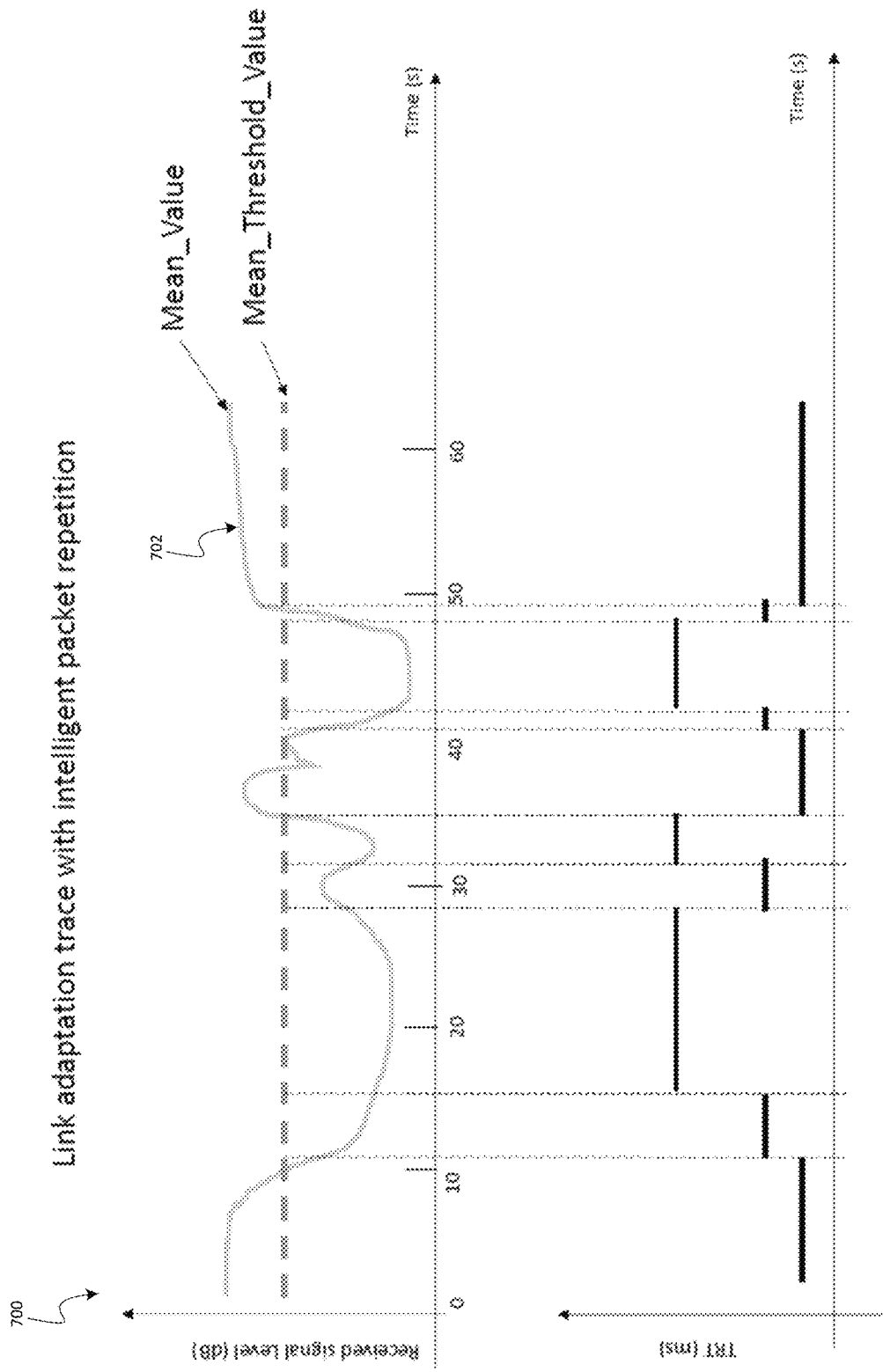
FIG. 7 is a diagram illustrating a link adaptation method according to some embodiments.

In another embodiment but still pertaining to the case where the receiver is selecting the degree of repetition and informing the transmitter, instead of specifying an N_Repeat value, the receiver may set an Update_Timer that is equal to the transmission repetition time (TRT) corresponding to the duration over which repetition is made. The TRT is given by the product of N_Repeat and the duration of the repeated packet of minimum size (the atomic transmitted unit), referred to as Minimum Transmission Block. After the Update_Timer expires, the receiver will update the N_Repeat value following the procedures described with respect to FIG. 4. Specifically, this means updating the transmitter with information about the next step, i.e., whether or not continue to perform repetition with an updated TRT (corresponding to an updated N_Repeat). If the receiver decides that there is a need to continue to perform repetition at the end of the timer, then the Update_Timer is reset to the new TRT, corresponding to the updated N_Repeat. If receiver decides that no more repetition is needed, as per the flow diagram of FIG. 4, the receiver updates the transmitter with information that N_Repeat=1, or the corresponding value of TRT, which are the default values for normal channel condition. FIG. 7 illustrates a graph 700, which includes a link adaption trace 702 according to such an embodiment, assuming the mean received-signal time-variation level profile shown in the top trace. As illustrated in FIG. 7, the above described embodiments would make transmission repetition adaptive to the channel condition without the need to make a repetition decision after the receipt of every Minimum Transmission Block, unlike HARQ. This is a very efficient way to achieve near optimal performance in randomly blocked channels, which is absent in the prior art.

As discussed herein, due to the reaction latency of 600 ms, for some situations where the channel conditions may switch rapidly between State 1, State 2 and State 3, the embodiment illustrated in FIG. 7 may not work well. Other possible embodiments may be more robust for these types of situations. For example, in another embodiment, once a receiver determines that a such channel condition is present by examining the received signal level or by the geographic location of the receiver, which may be known to involve a high probability of blockage, the receiver may decide to instruct the transmitter to keep doing a blind transmission repetition for a certain period of time regardless of the received signal level to ride out rapidly varying channel conditions. The receiver may set the Update_Timer to the period of time duration at the beginning, and by the end of the timer, the receiver would re-evaluate the channel condition, and decide the next step accordingly. Alternatively, the start and end of blind repetitions could be determined by receiver location, or some combination of the above factors. For example, it may be known a priori that certain stretches of a road, or areas of an urban area, are so heavily blocked that it would be best to turn on a certain level of repetition (say 8 repeats of each packet) everywhere in the above locations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this specification, relational terms for example, first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more general purpose or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the systems, methods and/or devices described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the foregoing approaches could be used.

Various features and advantages of some embodiments are set forth in the following claims.

What is claimed is:

1. A wireless communications system comprising:
a bidirectional wireless link between two transceivers containing electronic processors, configured to transmit and receive packetized wireless communications, wherein a receiver of one transceiver provides feedback information to a transmitter of the other transceiver, based on which information:
a determination is made using the transceivers' electronic processors determine:
that the bidirectional wireless link is subject to blockage,
an extent of the blockage, and
a packet repeat value indicative of a number of packet repetitions necessary to enable the receiver to receive transmitted packets with adequate reliability by packet combining, and
subsequent to the said determination, the transmitter sends the transmitted packets to the receiver based on the packet repeat value.

2. The wireless communication system of claim 1, wherein the determination of the packet repeat value is made at the receiver.

3. The wireless communication system of claim 2, wherein the determination of the packet repeat value is made at the transmitter.

4. The system of claim 1, wherein the electronic processors are configured to:
determine the packet repeat value by:
estimating a mean pathloss value for a transmitted signal of the bidirectional wireless link;
determining whether the mean pathloss value is less than a first threshold;
responsive to determining that the mean pathloss value is less than the first threshold, determining a deficit value for the transmitted signal;
determining whether the deficit value is less than a second threshold;
responsive to determining that the deficit value is less than the second threshold,
determining the packet repeat value based on a functional relationship between the deficit value and a number of packet repetitions.

5. The system of claim 4, wherein the electronic processors are configured to determine the deficit value calculating a difference between the first threshold value and the mean pathloss value.

6. The system of claim 4, wherein the functional relationship is based on an estimate of the packet error rate for the transmitted signal and a received signal to noise ratio for the transmitted signal at a receiver of the second communications device.

7. The system of claim 4, wherein the first threshold is set to a static value.

8. The system of claim 4, wherein the first threshold is determined dynamically using a machine learning model trained using historical mean pathloss values for the transmitted signal.

9. The system of claim 1, wherein the electronic processors are configured to:
set an update timer based on a transmission repetition time; and
responsive to the update timer expiring, determine an updated packet repeat value.

10. The system of claim 8, wherein the transmission repetition time is based on the packet repeat value and a minimum transmission block.

11. The system of claim 1, wherein the wireless communications system is part of a mobile satellite system.

12. The system of claim 1, wherein the decision to repeat packets and the packet repeat value are informed by the geographic location of the receiving transceiver.

13. A method for intelligent packet repetition, the method comprising:
transmitting and receiving packetized wireless communications between a first communications device and a second communications device via a bidirectional wireless link;
receiving, by the first communications device from the second communications device, feedback information including an indication of a blockage in the communication channel, the indication including information indicating a presence and an extent of the blockage, wherein the feedback does not include status indications for individual received packets;
responsive to receiving the indication of a blockage in the communication channel, determining a packet repeat value based on the feedback information, wherein the packet repeat value is greater than one;
modifying a downlink signal of the bidirectional wireless link to repeat transmitted packets based on the packet repeat value; and
transmitting the downlink signal.

14. The method of claim 13, wherein determining the packet repeat value includes:
estimating a mean pathloss value for the downlink signal;
determining whether the mean pathloss value is less than a first threshold;
responsive to determining that the mean pathloss value is less than the first threshold, determining a deficit value for the downlink signal;

determining whether the deficit value is less than a second threshold;

responsive to determining that the deficit value is less than the second threshold, determining the packet repeat value based on a functional relationship between the deficit value and a number of packet repetitions.

15. The method of claim 14, wherein determining the deficit value includes calculating a difference between the first threshold value and the mean pathloss value.

16. The method of claim 14, wherein the functional relationship is based on an estimate of the packet error rate for the downlink signal and a received signal to noise ratio for the downlink signal at a receiver of the second communications device.

17. The method of claim 14, wherein the first threshold is set to a static value.

18. The method of claim 14, further comprising:
determining the first threshold dynamically using a machine learning model trained using historical mean pathloss values for the downlink signal.

19. The method of claim 12, wherein the determination of the packet repeat value is performed by the second communications device.

20. The method of claim 19, further comprising:
setting an update timer based on a transmission repetition time; and responsive to the update timer expiring, determining an updated packet repeat value.

21. The method of claim 20, wherein the transmission repetition time is based on the packet repeat value and a minimum transmission block.

22. The method of claim 12, where the first communications device and the second communications device belong to a mobile satellite system.

* * * * *